C. C. JOHNSON.
TROLLEY GUARD.
APPLICATION FILED SEPT. 19, 1917.
1,371,788.
Patented Mar. 15, 1921.
2 SHEETS—SHEET 1.
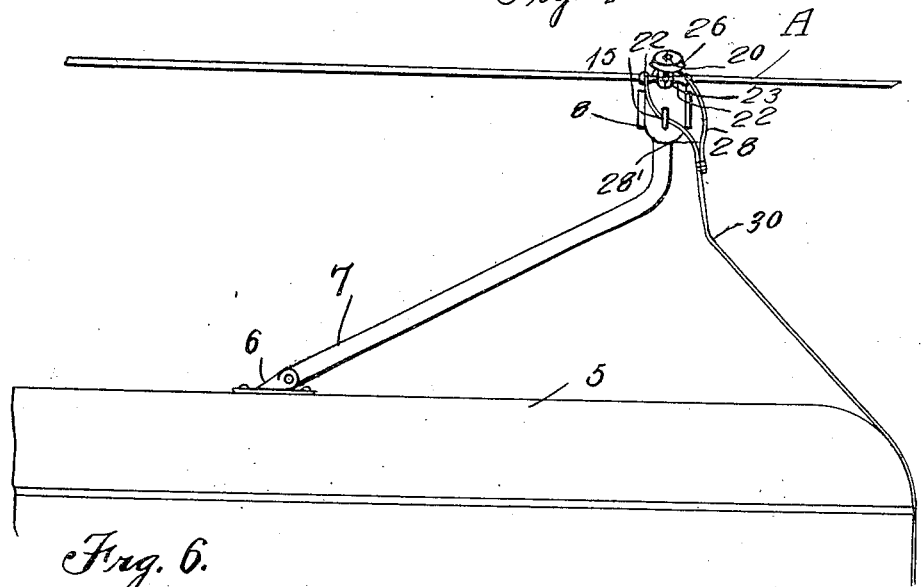
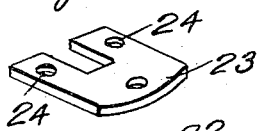
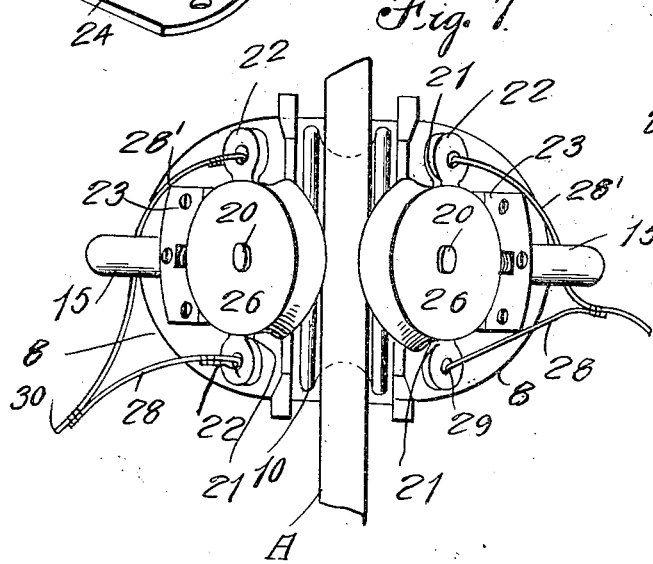
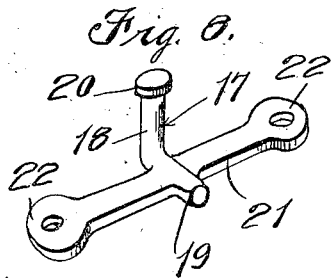
Witnesses
Inventor
C. C. Johnson
By
Attorney C. C. JOHNSON.
TROLLEY GUARD.
APPLICATION FILED SEPT. 19, 1917.
1,371,788.
Patented Mar. 15, 1921.
2 SHEETS—SHEET 2.
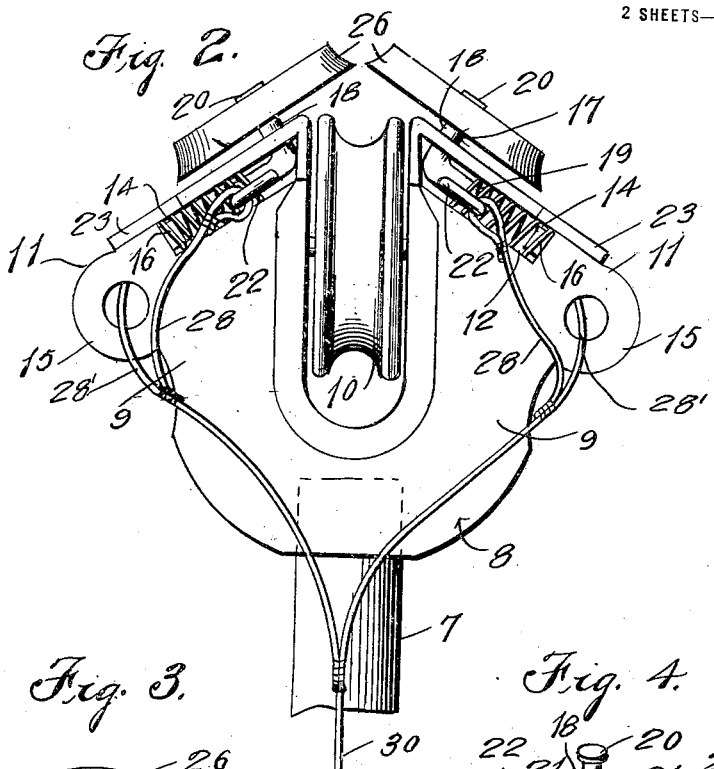
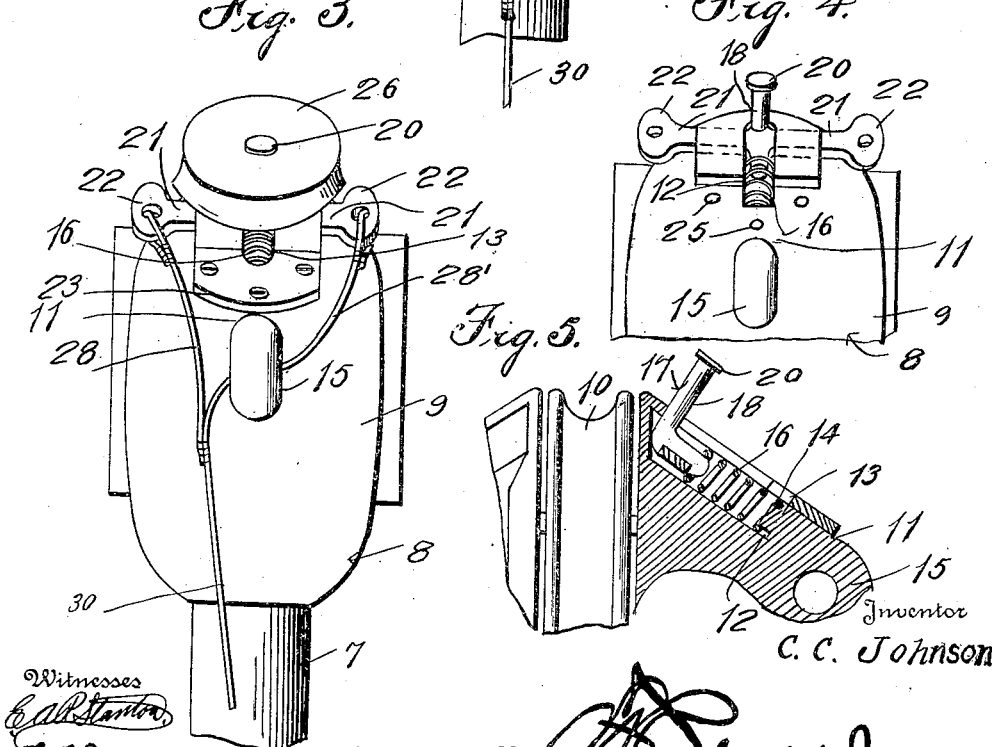
Inventor
C. C. Johnson

UNITED STATES PATENT OFFICE.

CHARLES C. JOHNSON, OF BALTIMORE, MARYLAND.

TROLLEY-GUARD.

1,371,788.      Specification of Letters Patent.      Patented Mar. 15, 1921.

Application filed September 19, 1917. Serial No. 192,131.

*To all whom it may concern:*

Be it known that I, CHARLES C. JOHNSON, a citizen of the United States, residing at Baltimore, State of Maryland, have invented certain new and useful Improvements in Trolley-Guards; and I do hereby declare the following to be a full, clear, and exact description of the invention, such as will enable others skilled in the art to which it appertains to make and use the same.

This invention relates to improvements in trolley guards.

The object of this invention is to provide an improved trolley guard, which will effectively serve to hold the trolley wheel in contact with the trolley wire when making curves or running at an excess speed.

A further object of this invention is to provide an improved trolley guard, which is provided with a pair of guard wheels adapted to overlie the trolley wire and trolley wheel to retain the trolley wire in the groove of the trolley wheel and prevent the same from being accidentally displaced from the trolley wire when the car is running.

A further object of the invention is to mount the guard wheels on the trolley head so that the same may be readily disengaged from the trolley wire when desired.

A still further object of this invention is to provide a trolley guard of this character, which will be simple, practical and comparatively inexpensive in construction.

With these and other objects in view, the invention consists in the novel combination and arrangement of parts hereinafter more fully described and set forth in the claim hereto appended.

In the drawings:

Figure 1 is a fragmentary side elevation of a car showing the trolley guard in use, Fig. 2 is a front elevation of my improved trolley guard, Fig. 3 is a side elevation of the same, Fig. 4 is a fragmentary side elevation illustrating the guard wheel removed, Fig. 5 is a fragmentary detail sectional view, Fig. 6 is a perspective view of the retaining plate, Fig. 7 is a top plan view of the guard as assembled and made in accordance with this invention, Fig. 8 is a perspective view of one of the actuating members for one guard wheel.

Referring to the drawings, the numeral 5 designates a fragmentary portion of a railway car now in general use and it has secured to its top, a bracket 6, which has pivotally secured therein, a trolley pole 7. The trolley pole 7 carries a head 8.

The head 8 is bifurcated to provide spaced arms 9, having a grooved trolley wheel 10 rotatably mounted therein. The trolley wheel 10 has an axle 10' mounted in suitable openings in the arms 9. Caps removably positioned over the openings permit of the positioning and removal of the trolley wheel. The outer sides of the arms are enlarged to provide faces 11 having recesses 12 defining shoulders 13. Lugs 14 extend into the recesses 12. The faces 11 are provided at their outer ends with eyes 15.

A coiled spring 16 is arranged in the recesses 12, in each arm of the head 8 and has one end surrounding the lug 14 as shown in Fig. 5. Operating members 17 are provided with vertical shanks 18. The lower portions of the operating members 17 are provided with angular arms 19 disposed within the recesses 12. Upon arranging the guard wheels 26 on the shanks 18, the shanks are flattened at their upper ends to provide heads 20. The angularly extending portions 19 are provided with laterally extending arms 21 on opposite sides of the same. The arms 21 have their outer ends terminating in eyes 22. The angularly extending portions 19 of the members 17 are arranged in the recesses 12 and are surrounded by one end of the springs 16. The tension of the springs 16 normally urges the members 17 over the trolley wire.

U-shaped retaining plates 23 are provided in the arms and webs with apertures 24, adapted to aline with apertures 25 located in the faces of the arms 9 for receiving fastening elements. The plates 23 are adapted to be secured over the recesses 12.

Guard wheels 26 are rotatably mounted on the shanks 18 and are adapted to normally overlie the trolley wheel 10 and the trolley wire A, thereby preventing the trolley wheel from leaving the wire during the travel of the car.

Cables 28 are provided with branches 28' and 28'. The branches 28' are passed through the eyes 15 carried by the arms 11 and are connected to one of the eyes 22 of the members 17. The branches 28 are extended upwardly and connected as at 29 to the eyes 22 of the other arms of the members 17. The cables are connected to a main operating cable 30 extending to within convenient reach of the operator of the car.

The initial pull of the main operating cable serves to withdraw the guard wheels 26 from overlapped engagement with the trolley wire, upon further pull of the main cable 30 the trolley wheel will be removed from engagement with the trolley wire.

What is claimed is:

A trolley guard comprising a head having a recess disposed medially thereof and provided at its edges and at the opposite sides of the said recess with sloping guide ways disposed at acute angles to the side walls of the recess, eyes formed at the opposite side portions of the head and beyond the outer ends of the guide way, a trolley wheel journaled in the recess, members mounted for movement along the guide way, springs bearing at their outer ends against fixed portions of the head and at their inner ends against said members and being under tension with a tendency to hold the members toward the recess, wheels journaled upon the members and lying above the upper edges of the head, the axes of the wheels being disposed at right angles to the path of movement of the members and disposed at acute angles to the side walls of the recess, the said wheels being provided with concave beveled peripheries, the sides of the wheels which are of major diameter being disposed toward the trolley wheel and cable sections connected with the members and trained through the eye and connected with each other to form a single cable.

In testimony whereof I affix my signature in presence of two witnesses.

CHARLES C. JOHNSON.

Witnesses:
 CHARLES JONES,
 CHARLES HENRY PARKER.